Patented Jan. 9, 1951

2,537,845

UNITED STATES PATENT OFFICE 2,537,845

PROCESS FOR PRODUCING ALKENYL ESTERS OF ENDOALKYLENE-TETRA-HYDROPHTHALIC ACIDS

Rupert C. Morris, Berkeley, Alva V. Snider, Richmond, and Robert M. Horowitz, Berkeley, Calif., assignors to Shell Development Company, San Francisco, Calif., a corporation of Delaware No Drawing. Application September 30, 1944, Serial No. 556,666

3 Claims. (Cl. 260—468)

This invention relates to a process for the production of polymerizable unsaturated esters, and it more particularly relates to a process for the production of alkenyl esters of endoalkylene-tetrahydrophthalic acids. Still more particularly, the invention relates to a process for producing beta,gamma-alkenyl esters of 3,6-endoalkylene-1,2,3,6-tetrahydrophthalic acids.

The endoalkylene - 1,2,3,6 - tetrahydrophthalic acid esters have the general formula

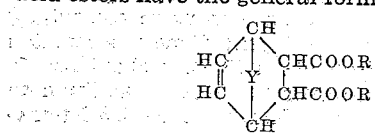

wherein at least one R represents an allyl-type unsaturated group which may be derived from an unsaturated alcohol, as is more fully disclosed hereinbelow, and Y is an alkylene group such as a methylene group or an ethylene group. These compounds may also be named the allyl-type esters of the 3,6-endoalkylene-Δ⁴-tetrahydrophthalic acids or the allyl-type esters of the 3,6-endoalkylene - 4 - cyclohexen - 1,2 - dicarboxylic acids. There may also be substituted upon the carbon atoms of the cyclohexene nucleus substituent groups such as alkyl groups, halogen atoms, ether groups, etc. Suitable alkyl groups which may be thus substituted upon a nuclear carbon atom are the methyl, ethyl, n-propyl, i-propyl, n-butyl, sec-butyl, i-butyl, tert-butyl, amyl, tert-amyl, hexyl, heptyl, and octyl groups and the like.

As stated, at least one R in the general formula given hereinabove represents an allyl-type unsaturated group which may be derived from an allyl-type alcohol, i. e. an alcohol which has a double bond of aliphatic character between two carbon atoms, one of which is directly attached to a saturated carbinol atom. Such alcohols have an atomic grouping which may be represented by the general formula

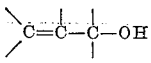

Examples of such allyl-type groups are the allyl, methallyl, ethallyl, chloroallyl, bromoallyl, methoxyallyl, ethoxyallyl, cyanoallyl, hydroxyallyl, crotyl, tiglyl, cinnamyl, methyl vinyl carbinyl, ethyl vinyl carbinyl, n-propyl vinyl carbinyl, isopropyl vinyl carbinyl, dimethyl vinyl carbinyl, methyl ethyl vinyl carbinyl, etc.

The other R group in the above general formula may also be an allyl-type group, for example, an allyl group of the type set forth in the above examples. It may also be any other type of unsaturated group such as vinyl-type group as, for example, a vinyl, isopropenyl, isobutenyl, cyclohexenyl, etc., or an acetylenic group such as the propargyl group. The second R in the said formula may also be a saturated hydrocarbon group. Thus, it may be an alkyl group such as a methyl, ethyl, n-propyl, i-propyl, n-butyl, sec-butyl, i-butyl, amyl, hexyl, heptyl, or octyl group. It may also be a group of cyclo-aliphatic character, e. g. a cyclopentyl, methylcyclopentyl, cyclohexyl, or methylcyclohexyl group, or an aromatic group, e. g. a phenyl, tolyl, or xylyl group. Any of the aforementioned hydrocarbon groups may be substituted with suitable substituent atoms or groups, e. g. a halogen atom, such as a chlorine or bromine atom, a hydroxyl group, an alkoxy group, e. g. a methoxy group, a keto group, a cyano group, an amino group, etc.

In accordance with the process of the invention, a beta,gamma-alkenyl ester of a 3,6-endoalkylene-1,2,3,6-tetrahydrophthalic acid having 1 to 2 carbon atoms in the endoalkylene group is prepared directly by a reaction between a cyclic conjugated diene having 5 to 6 carbon atoms per molecule and a beta,gamma-alkenyl ester of maleic acid having not more than 4 carbon atoms in the beta,gamma-alkenyl group. Thus, diallyl-3,6-endomethylene-1,2,3,6-tetrahydrophthalate may be prepared by the simple condensation of cyclopentadiene with diallyl maleate:

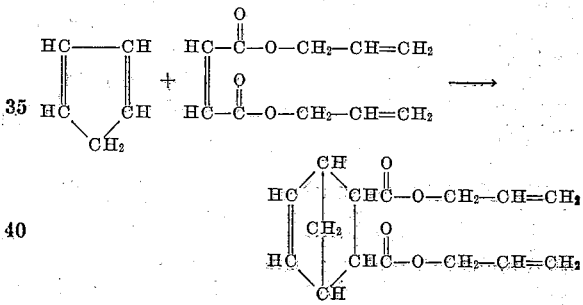

The resulting ester, which contains an unsaturated olefinic linkage between the beta and gamma carbon atoms of the alcohol residue, may be referred to as a beta,gamma-alkenyl ester of a 3,6-endoalkylene-1,2,3,6-tetrahydrophthalic acid. The reaction may be carried out by heating a mixture of the cyclic conjugated diene and the beta,gamma-alkenyl ester of maleic acid at a temperature which is sufficiently elevated to effect the addition of the maleic acid ester to the conjugated cyclic diene, thereby forming the desired 3,6-endoalkylene-1,2,3,6-tetrahydrophthalic acid ester. The reaction may usually be carried out, for example, by forming a mixture of cyclic conjugated diene and an unsaturated ester of maleic acid, heating the said mixture at a reaction temperature, e. g. a reaction temperature of between about 75° C. and about 125° C., preferably about 100° C., and separating the unsaturated ester product by any suitable method, as by fractional distillation of the reaction product under diminished pressure. This condensation reaction may be carried out at atmospheric or superatmospheric pressures and in the presence or absence of a suitable solvent such as benzene or toluene.

Suitable cyclic conjugated dienes that can be employed according to the process of the invention include cyclopentadiene, methylcyclopentadiene, bromocyclopentadiene, cyclohexadiene-1,3, chlorocyclohexadiene-1,3 and bromocyclohexadiene-1,3. Esters of maleic acid that can be employed in the process of the invention include diallyl maleate, monoallyl maleate, dimethallyl maleate, dicrotyl maleate, and like beta,gamma-alkenyl esters of maleic acid having not more than 4 carbon atoms in the beta,gamma-alkenyl group.

As a specific embodiment of the process of the invention a cyclic conjugated diene such as cyclopentadiene may be mixed with an allyl-type ester of maleic acid, e. g. diallyl maleate, and the resulting mixture heated to a temperature of about 100° C. for a reaction time of about 4 hours. The reaction product may then be fractionally distilled in order to obtain the desired 3,6-endoalkylene-1,2,3,6-tetrahydrophthalic acid ester.

The beta,gamma-alkenyl esters of 3,6-endoalkylene-1,2,3,6-tetrahydrophthalic acids that are produced by the process of the present invention are useful inter alia as plasticizers, as light stabilizers for resins of the vinylidene chloride type, as insecticidal toxicants which may be used per se or in admixture with other substances and, in particular, as intermediates for the preparation of useful polymers, including homopolymers as well as copolymers with such polymerizable ethylenic compounds as styrene, vinyl halides, vinylidene halides, vinyl esters of saturated monocarboxylic acids, methyl acrylate, methyl methacrylate, allyl halides, allyl esters of saturated monocarboxylic acids, vinyl ethers, conjugated butadiene, diallyl phthalate and the like. The polymers and copolymers can be used in the preparation of surface coatings, as molding resins, and as casting resins.

The invention may be illustrated by the following examples wherein the parts are parts by weight.

Example I

Diallyl - 3,6 - endomethylene - 1,2,3,6-tetrahydrophthalate was prepared by adding about 2 parts of cyclopentadiene to about 5 parts of diallyl maleate which contained a small amount of a polymerization inhibitor comprising tannic acid. The resulting mixture was heated to a temperature of about 100° C. and maintained at that temperature for about 4 hours. Distillation of the reaction mixture resulted in the separation of an 88% yield of pure diallyl-3,6-endomethylene-1,2,3,6-tetrahydrophthalate. Diallyl 3,6-endomethylene-1,2,3,6-tetrahydrophthalate boils at 120° C. to 123° C. at 1.5 mm. Hg pressure. It is a clear liquid which remains water-white even after prolonged periods of standing. Its specific gravity (20/4) is about 1.1145 and its refractive index (20/D) is about 1.4950.

Example II

The monoallyl ester of 3,6-endomethylene-1,2,3,6-tetrahydrophthalic acid may be prepared from cyclopentadiene and monoallyl maleate using substantially the same procedure as is employed for the preparation of the diallyl ester, as set forth in Example I.

We claim as our invention:

1. A method for the production of diallyl-3,6-endoethylene-1,2,3,6-tetrahydrophthalate which comprises heating a mixture comprising diallyl maleate and cyclohexadiene at a reaction temperature of from about 75° C. to about 125° C. to cause said materials to react by addition to form said diallyl-3,6-endoethylene-1,2,3,6-tetrahydrophthalate.

2. A method for the production of diallyl-3,6-endomethylene - 1,2,3,6 - tetrahydrophthalate which comprises heating a mixture comprising diallyl maleate and cyclopentadiene at a reaction temperature of from about 75° C. to about 125° C. to cause said materials to react by addition to form said diallyl-3,6-endomethylene-1,2,3,6-tetrahydrophthalate.

3. A process for the production of a beta,gamma-alkenyl ester of a 3,6-endoalkylene-1,2,3,6-tetrahydrophthalic acid having 1 to 2 carbon atoms in the endoalkylene group, which comprises heating a mixture comprising a cyclic conjugated diene having 5 to 6 carbon atoms per molecule and a beta,gamma-alkenyl ester of maleic acid at a reaction temperature of from about 75° C. to about 125° C. to cause said materials to react by addition to form said beta,gamma-alkenyl ester.

RUPERT C. MORRIS.
ALVA V. SNIDER.
ROBERT M. HOROWITZ.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 2,221,663 | Rothrock | Nov. 12, 1940 |
| 2,275,034 | Moyle | Mar. 3, 1942 |
| 2,311,261 | Staff | Feb. 16, 1943 |
| 2,359,038 | Hopff et al. | Sept. 26, 1944 |
| 2,409,633 | Kropa | Oct. 22, 1946 |